US012784318B1

(12) United States Patent
Muaz et al.

(10) Patent No.: US 12,784,318 B1
(45) Date of Patent: Nov. 3, 2026

(54) TECHNIQUES FOR GENERATING SCALABLE TALKING AVATARS

(71) Applicant: Amazon Technologies, Inc., Seattle, WA (US)

(72) Inventors: Urwa Muaz, London (GB); Brandon Michael Smith, Fremont, CA (US); Baris Gecer, London (GB); Ganesh Subramanian Iyer, Cupertino, CA (US); Nicolas Heron, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 18/615,662

(22) Filed: Mar. 25, 2024

(51) Int. Cl.
*G06T 13/40* (2011.01)
*G06T 7/50* (2017.01)
*G06T 7/70* (2017.01)
*G06T 13/20* (2011.01)
*G06T 19/20* (2011.01)

(52) U.S. Cl.
CPC ................ *G06T 13/40* (2013.01); *G06T 7/50* (2017.01); *G06T 7/70* (2017.01); *G06T 13/205* (2013.01); *G06T 19/20* (2013.01); *G06T 2219/2021* (2013.01)

(58) Field of Classification Search
None
See application file for complete search history.

(56) References Cited

U.S. PATENT DOCUMENTS 11,582,519 B1 * 2/2023 Bhat .................. H04N 21/4666
11,587,548 B2 * 2/2023 Zhang ................... G10L 13/027
2014/0192059 A1 * 7/2014 Koperwas ............... G06T 13/40 345/473

(Continued)

FOREIGN PATENT DOCUMENTS

CN 112330781 A * 2/2021 ............. G06N 3/045
CN 117115295 A * 11/2023 ........... G06T 11/001

OTHER PUBLICATIONS

Ezzat, Tony, and Tomaso Poggio. “Miketalk: A talking facial display based on morphing visemes.” Proceedings Computer Animation’98 (Cat. No. 98EX169). IEEE, 1998. (Year: 1998).*

(Continued)

*Primary Examiner* — Zhengxi Liu
(74) *Attorney, Agent, or Firm* — Kilpatrick Townsend & Stockton LLP

(57) ABSTRACT

Techniques are disclosed for generating realistic talking avatar videos from a prompt and a script. A computer system can implement a trained avatar model that includes a diffusion model that can generate a neural texture usable to generate each frame of a talking avatar video. The computer system can generate audio from the script. The script can include text of a narration to be synchronized with a talking avatar. The computer system can generate an avatar expression sequence using the audio. The computer system can receive a prompt characterizing an avatar appearance. Using the prompt and the audio, the computer system can generate the talking avatar video using the trained avatar model taking as inputs the avatar expression sequence and the text prompt. The talking avatar video can include the audio synchronized with a sequence of image frames generated using the neural texture.

20 Claims, 8 Drawing Sheets

(56) References Cited

U.S. PATENT DOCUMENTS

| | | | | |
|---|---|---|---|---|
| 2017/0125019 | A1* | 5/2017 | Ganesan | H04M 1/72454 |
| 2024/0104924 | A1* | 3/2024 | Darrah | G01V 99/00 |
| 2025/0132036 | A1* | 4/2025 | Weston | G16H 40/67 |

OTHER PUBLICATIONS

Zipeng, Y. "Dynamic neural textures: Generating talking-face videos with continuously controllable expressions." arXiv preprint arXiv:2204.06180 (2022). (Year: 2022).*

Bergman, Alexander W., Wang Yifan, and Gordon Wetzstein. "Articulated 3d head avatar generation using text-to-image diffusion models." arXiv preprint arXiv:2307.04859 (2023). (Year: 2023).*

Metzer, Gal, et al. "Latent-nerf for shape-guided generation of 3d shapes and textures." Proceedings of the IEEE/CVF conference on computer vision and pattern recognition. 2023. (Year: 2023).*

He, Tianyu, et al. "Gaia: Zero-shot talking avatar generation." arXiv preprint arXiv:2311.15230 (2023). (Year: 2023) (Year: 2023).*

U.S. Appl. No. 18/615,787, Patent Application, "Techniques for Generating Realistic Avatar Videos", filed Mar. 25, 2024, 38 pages.

* cited by examiner

TECHNIQUES FOR GENERATING SCALABLE TALKING AVATARS

BACKGROUND

Generative artificial intelligence (AI) has recently made groundbreaking strides to the production of conversational prose, imagery, and video, including depictions of close-to-lifelike humans. The models underlying the generative AI are sophisticated and can require substantial computing resources to harness, particularly for realistic video. As the demand for more realistic, customizable, and ad hoc video content increases, the need for more efficient generative AI models will also increase.

BRIEF DESCRIPTION OF THE DRAWINGS

Various embodiments in accordance with the present disclosure will be described with reference to the drawings, in which.

DETAILED DESCRIPTION

Figure 1:
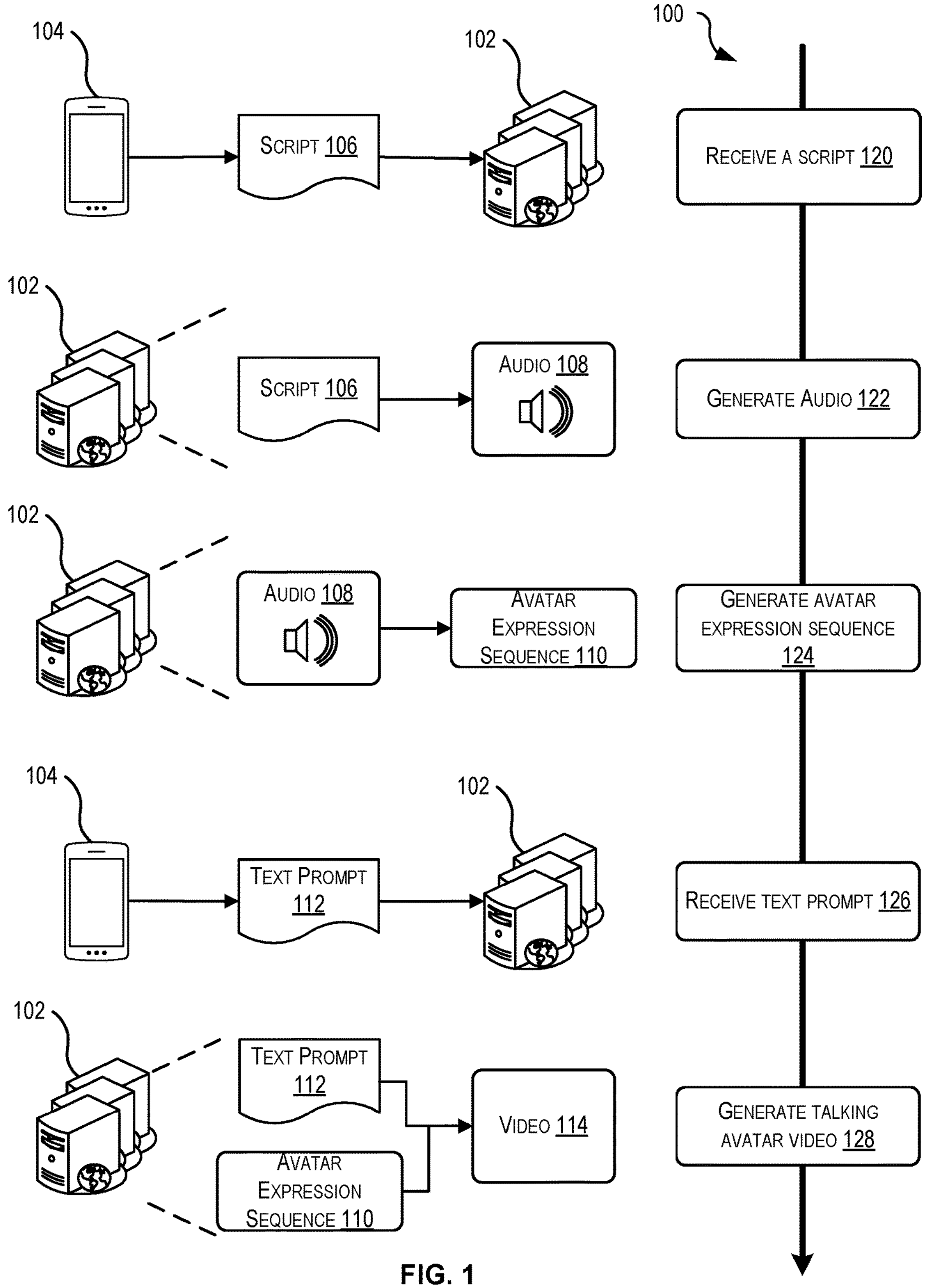
FIG. 1 is a block diagram and associated flow chart of an example process to generate a talking avatar video, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generative artificial intelligence (AI) has recently developed the capacity to produce original, creative works of textual information, still images, and even video. For example, large language models (LLMs) like GPT have been used to produce responsive and natural text output to various prompts, with the ability to convey information in a readable manner. As another example, multimodal implementations of an LLM like GPT (e.g., DALL-E) have been configured to produce still images of scenes based on text inputs.

However, not all media have been amenable to generative AI methods. For example, one type of media is a "talking head video," in which a person speaks while facing the camera. These videos can cover a wide range of subjects, including coaching or educational content, advertisements and branding videos, customer testimonials, news or other factual information, and the like. These videos are typically created with a person speaking to a camera, either using a script or extemporaneously, and can convey information quickly and understandably due to portrayal of a real human speaking. Talking head videos resist conventional techniques of generative AI due to both the need for realism in the depicted person and the computational expense and time required to create a video. A talking head video with a conventionally-generated avatar rather than a real human may be disconcerting to a viewer and not effective in conveying the information.

Embodiments of the present disclosure are directed to techniques to generate a video with a realistic human avatar that speaks as in a talking head video. In particular, the techniques described herein include a computer system that can execute a trained avatar model that includes an implementation of a diffusion model for creating depictions of a human avatar that both look and speak realistically, so that the resulting talking avatar video is as similar as possible to a video created by a human speaker. The trained avatar model can take a prompt describing the avatar and a script as inputs and generate the talking avatar video. The script can be any string of text to be spoken by the avatar, and can be in one or more languages. The trained avatar model can use the script to generate audio to be spoken with a text to speech (TTS) system, and then use the audio to create realistic models of an avatar as that audio would be produced (e.g., lip and mouth shape, expression) by a person speaking it. The prompt can be, for instance, a text description of the avatar, including an appearance. The diffusion model can take keywords from the prompt to generate, using a diffusion reverse process, a neural texture that can be used for each frame, and correspondingly, each particular pose, expression, and/or shape of the avatar while speaking. Once the neural texture has been generated once, the trained avatar model need not repeat the computationally expensive diffusion process and can sample the neural texture repeatedly to create each frame of the talking avatar video. Additionally, the techniques described herein include a computer system that can train a trained avatar model to generate the talking avatar video.

To illustrate with a specific example, a user may create a prompt for an avatar as "an upper body shot of a casually dressed person in their mid-twenties" for use to generate a talking avatar video providing a customer testimonial of a product. The prompt can also specify an emotion for the avatar, including "neutral," "excited," "happy," and the like. From this prompt, the trained avatar model can generate a neural texture from which a texture to be applied to all frames of a modeled avatar can be sampled. The user can also supply a script in one or more languages describing the product and the user's experience with the product. For the language, the user can also provide an indication as to an accent. For example, for a script in English, the user can specify whether they would like an American English accent, a British English accent, or other accent. In some cases, the trained avatar model can infer an accent based on the text present in the script (e.g., if words are spelled using a British English spellings, the trained avatar model can infer a British English accent). From the script, the trained avatar model can generate audio using a TTS system. The audio can then be input into an avatar shape forming model to produce a sequence of expressions corresponding to the speech in the audio. The avatar expression sequence can then be input into an avatar shape model (e.g., Faces Learned from an Articulated Model and Expressions (FLAME)) that can render a two dimensional raster of the avatar shape for each frame of the video. The neural texture can then be sampled to apply to each raster to create the frames of the talking avatar video. Because the expression sequence is generated from the audio, the avatar in the talking avatar video can be synchronized with the audio to appear to be accurately speaking the audio.

Although the talking avatar videos are primarily discussed herein with the example of a talking head, the avatars are in general not so limited. The avatars can also depict avatar bodies, including arms and hands used to gesture realistically. The trained avatar model can be trained using training data that includes both head shots of a speaking person and full body shots and/or upper body shots of a speaking person.

The techniques described herein can provide numerous technical advantages over conventional generative AI systems for producing video. As one example, a conventional digital twin system can produce realistic video of a specific person used in the training data of the digital twin system. The digital twin system can produce a video of the twinned person speaking a script. However, modifications to the digital twin's appearance, including shape and emotions, are not possible without wholly recreating the initial training data. Moreover, the digital twin requires substantial initial data from a single person recording multiple videos to train and prepare the model. For example, a digital twin system for a single person may require over a week of video recording and model training to produce realistic results for that single person. A digital twin system capable of generating videos for several different avatar appearances would require substantial time and computational storage resources to produce the different initial data for each different person's appearance used in the twinning. By contrast, the trained avatar model described herein can produce realistic avatars for a continuum of appearances using substantially less training data.

As another example, a conventional diffusion model configured to produce video (rather than individual images) does not produce realistic and high quality talking head videos. These conventional diffusion models have difficulty maintaining temporal consistency across frames as the diffusion model generates the output image frames. These diffusion models also perform a diffusion process for each frame of the video, resulting in significant computational cost from the execution of the diffusion process hundreds or thousands of times for a single video. The latency incurred from the multiple executions of the diffusion process can also degrade the user experience. The trained avatar model of the present disclosure avoids the time and computational expense of conventional video diffusion. Because the neural texture may only be generated once for a talking avatar video, the computational resources for executing the diffusion model are only expended once, resulting in faster video generation. In addition, the user can provide additional inputs or updates to the trained avatar model to adjust the talking avatar video without repeating the diffusion process. For example, the script can be modified to change content of the speech. The updated script can be used to generate updated avatar expression sequences while the original neural texture is reused for sampling with the updated avatar shape rasters.

As a third example, a conventional diffusion model can be used to generate an image of a face that is subsequently animated using existing image animation techniques. However, animating a single frame of a (realistic) face produces robotic, unnatural, and unrealistic videos due to the image lacking the correct pose modeling of a face speaking the audio inputs. The trained avatar model avoids these issues by accurately generating a model of the avatar from the audio and then applying the neural texture generated by the diffusion model to produce the avatar appearance.

The trained avatar model described herein can be used to produce talking avatar videos for a variety of uses, particularly when a video needs to be created quickly and with low latency between receiving the inputs to the trained avatar model and generating the video. For example, realistic talking avatar videos could allow chatbots to have a realistic interface speaking the chat responses in near real-time. As another example, a user could produce a customized avatar for a product advertisement or customer testimonial quickly after offering the product for sale or using the product.

Turning now to the figures, FIG. 1 is a block diagram and associated flow chart of an example process 100 to generate a talking avatar video, according to some embodiments. The diagram shows elements of a computer system corresponding to the blocks of process 100. The process 100 can be performed by a computer system, which can include a server device 102 and a user device 104. Additional details about different computer systems that are capable of performing the techniques of the disclosure are provided below with respect to FIG. 8. In some embodiments, the server device 102 can both execute a trained avatar model and perform operations for training the trained avatar model. The server device 102 may be a component of a system of a service provider that can provide the trained avatar model or a pipeline incorporating the trained avatar model to users for the generation of talking avatar videos. The service provider may provide storage for talking avatar videos and other data generated by the trained avatar model.

The process 100 may begin at block 120 with the server device 102 receiving a script 106. The script 106 may be received from the user device 104. The script 106 can include text generated by input at the user device 104. For example, a user can type a script 106 for an avatar to speak in a talking avatar video. In some examples, the user can generate the script 106 by voice using a speech to text system on the user device 104. The script 106 can include text in one or more languages. For example, the script 106 may be a product description written in English, and the product description may be repeated in Spanish. In some examples, the script 106 can be primarily in a first language (e.g., English) with several interspersed words in a second language (e.g., Spanish). In some embodiments, the script 106 may itself be generated by a generative AI system (e.g., a large language model, a multimodal model, etc.) on the server device 102 based on keywords or other input provided at the user device 104.

At block 122, the server device 102 can use the script 106 to generate audio 108. The audio 108 may be generated using a text to speech (TTS) system executed by the server device 102. The audio 108 can be the script 106 as spoken in a variety of voices, languages, and/or accents. For example, a user may specify that that the audio 108 should be generated with a male or female voice or with a particular accent for the language corresponding to the text of the script 106. The server device 102 may have available a predetermined number of different voices and accents with which to generate the audio 108. In some examples, the server device 102 can infer an accent based on the text of the script 106. For instance, the spelling of words using British English (e.g., "colour," "practise," etc.) can indicate that the resulting audio 108 should have a British English accent.

At block 124, the server device 102 can use the audio 108 to generate an avatar expression sequence 110. The server device 102 can implement an avatar shape forming model to generate the avatar expression sequence 110. The avatar shape forming model can determine parameters of a facial geometry corresponding to the phonetics of the spoken words in the audio 108. For example, the avatar expression sequence 110 can specify the geometry of a mouth, lips, and jaw corresponding to the audio 108. In some examples, the avatar expression sequence 110 can include viseme vectors that associate mouth, lips, and jaw shapes and orientations with various phonemes that are present in the audio 108. The avatar expression sequence 110 may include parameters of a facial geometry corresponding to each frame of the talking avatar video. For example, if the talking avatar video plays at 30 frames per second for 20 seconds, the avatar expression sequence 110 can include a sequence of parameters for the shape of the avatar for 600 individual frames. In some examples, the avatar expression sequence 110 can include more or fewer parameters than the number of frames of the output talking avatar video depending on how the parameters are used to generate each corresponding pose of the model of the avatar.

At block 126, the server device 102 can receive a text prompt 112. As with the script 106, the text prompt 112 can be received from the user device 104. The text prompt 112 can include a description of the desired avatar for the talking avatar video. As discussed briefly above, the text prompt 112 can include keywords corresponding to user-customizable aspects of the avatar's appearance. For example, the text prompt 112 can include, but is not limited to, information characterizing an avatar's hair color, hair style, eye color, clothing style, and/or whether the avatar should be presented in a full body view, an upper body view, or a head view.

In some embodiments, in addition to the text prompt 112, the user can also provide inputs at the user device 104 to modify the shape of the avatar. The user device 104 can present a graphical user interface (GUI) with elements allowing the user to adjust avatar shape parameters. For example, the GUI can include one or more sliders for the user to adjust avatar shape parameters corresponding to features like width, nose shape and position, eye shape and position, and the like. Such additional input from the user device 104 can be used to modify the shape of the underlying avatar shape model defined by the avatar expression sequence 110, while the text prompt 112 can be used to define the texture applied to the avatar shape model as described in more detail below.

At block 128, the server device 102 can execute a trained avatar model that takes the text prompt 112 and the avatar expression sequence 110 as inputs and generate a talking avatar video 114. In the trained avatar model, the text prompt 112 can be used as inputs into a diffusion model configured to generate a neural texture using information from the text prompt 112. For example, the diffusion model can include a neural network (e.g., a U-net) in which information from the text prompt 112 can be used to set cross-attention parameters of the neural network for a diffusion reverse process. The diffusion model can then generate a neural texture (e.g., an output of the reverse process in the latent space of the diffusion model) that can be sampled to produce textures for the avatar. The neural texture can be a tensor including information defining the appearance of the desired avatar.

The trained avatar model can also take the avatar expression sequence 110 as well as other user inputs defining the shape and/or pose of the avatar to generate an avatar shape model for the avatar. For example, the trained avatar model can include a FLAME model that can take the avatar shape parameters of the avatar expression sequence 110 (e.g., pose and expression parameters) and generate a three-dimensional avatar shape model. The trained avatar model can render a two-dimensional raster (e.g., in U-V coordinates) for the resulting avatar for each frame of the talking avatar video 114. The trained avatar model can then sample the neural texture for each of the rasters to texture the avatar for each frame of the resulting talking avatar video 114. The server device 102 can finally synchronize the audio 108 with the frames to produce the talking avatar video 114. Specific details of the trained avatar model are provided below with respect to FIGS. 2 and 3.

Figure 2:
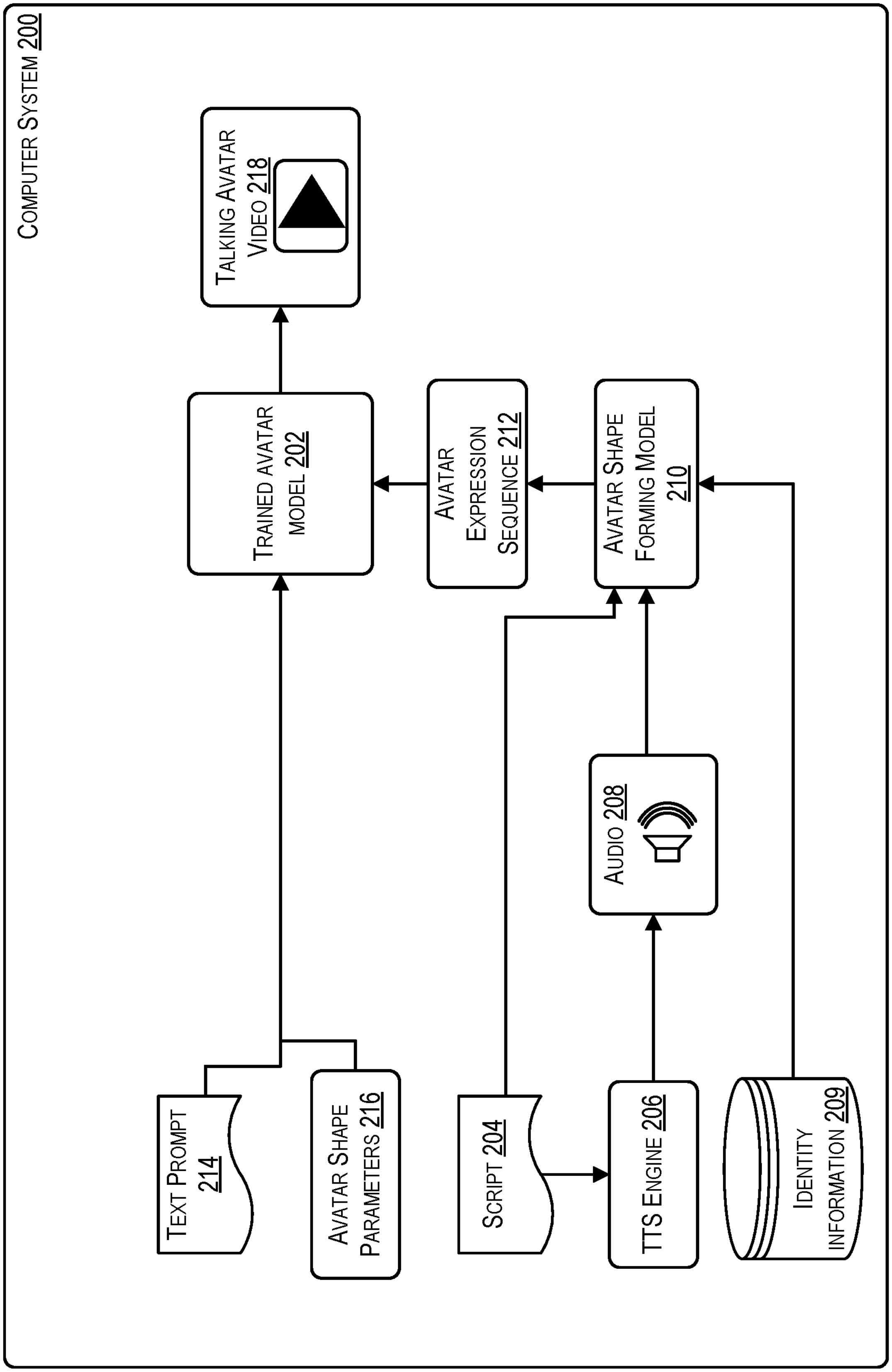
FIG. 2 is an example architecture of a computer system implementing a trained avatar model for generating a talking avatar video, according to some embodiments.

FIG. 2 is an example architecture of a computer system 200 implementing a trained avatar model 202 for generating a talking avatar video, according to some embodiments. The computer system 200 may be an example of the server device 102 described above with respect to FIG. 1. In some embodiments, the computer system 200 can include one or more computing devices configured to implement aspects of the trained avatar model 202, including cloud computing devices.

The trained avatar model 202 can be configured to take as inputs a text prompt 214, avatar shape parameters 216, and an avatar expression sequence 212 to produce a talking avatar video 218. The text prompt 214 may be an example of text prompt 112 of FIG. 1 and avatar expression sequence 212 may be an example of avatar expression sequence 110 of FIG. The avatar shape parameters 216 can include the additional user input defining the shape of the avatar, including, for example, parameters for width, position of features, and the like. The avatar shape parameters 216 may be provided by a user via a GUI of a user device. In some embodiments, the avatar shape parameters 216 can be input to the trained avatar model 202 after the trained avatar model 202 generates a neural texture or generates the talking avatar video 218. For example, the trained avatar model 202 may generate a talking avatar video 218 using an initial text prompt 214 describing a desired avatar appearance and an initial avatar expression sequence 212 based on a script 204. After viewing the talking avatar video 218 and the resulting avatar, the user can make adjustments to avatar shape parameters 216 and have trained avatar model 202 generate an updated talking avatar video 218 using the adjusted avatar shape parameters 216. Because the trained avatar model 202 has already performed the diffusion process of a diffusion model once to produce a neural texture, the updated avatar shape parameters 216 can result in the trained avatar model 202 only updating the corresponding avatar shape rasters to generate an updated avatar in the updated video.

The avatar expression sequence 212 may be generated from the script 204. The computer system 200 can include a TTS engine 206 configured to generate audio 208 from the script 204. The audio 208 can then be input to an avatar shape forming model 210 to generate the avatar expression sequence 212. The avatar shape forming model 210 can include a machine learning model, for example, a transformer based model, to generate parameters of the avatar expression sequence 212. In some embodiments, the avatar shape forming model 210 can take text inputs from the script 204. For example, the script can include superlative (e.g., "best") or words conveying emotion (e.g., "exciting," "amazing," etc.) that are associated with particular facial expressions (e.g., excitement conveyed with a smile and wide-open eyes). The avatar shape forming model 210 can determine particular facial expressions that correspond to these words using the text of the script. In this way, the avatar expression sequence 212 can characterize the avatar to both correctly synchronize with the lip and mouth movements of the audio 208 as well as express the corresponding emotion with eye, cheek, and jaw movements.

In some embodiments, the avatar shape forming model 210 can also take identity information 209 as input. Identity information 209 can include information that characterizes the expression of a particular avatar. For example, a user may want the avatar of the talking avatar video 218 to speak and perform expressions in a similar manner to the user. The user's manner of speaking may be characterized by the identity information 209. More broadly, the identify information 209 can describe many different facial expressions for different avatar appearances, so that the avatar shape forming model 210 can determine an avatar expression sequence 212 in accordance with the identity information 209. Identity information 209 may be used with appropriate authorization from a user, to provide security for the identity information 209.

Figure 3:
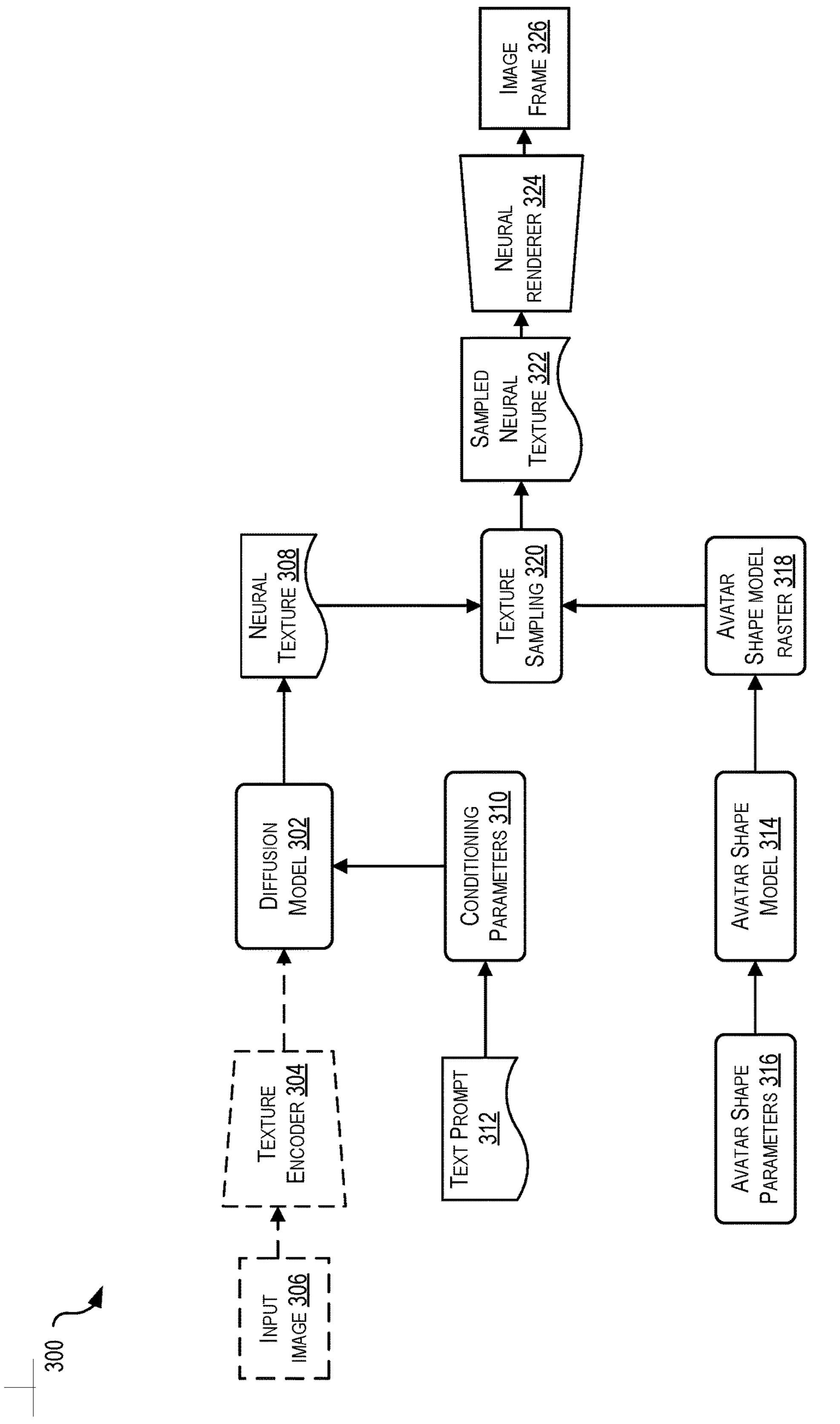
FIG. 3 is a block diagram illustrating an example architecture of a trained avatar model, according to some embodiments.

FIG. 3 is a block diagram illustrating an example architecture of a trained avatar model 300, according to some embodiments. The trained avatar model 300 may be an example of trained avatar model 202 described above with respect to FIG. 2. As shown in FIG. 3, arrows are used to indicate a general flow of data or other information between components of the trained avatar model 300 and are not meant to constrain the trained avatar model 300 to a specific operation with regard to the inputs and outputs.

The trained avatar model 300 can include a diffusion model 302. The diffusion model 302 may be a latent diffusion model configured to infer an output in the latent space using conditioning parameters 310. As a latent diffusion model, the diffusion model 302 can include one or more neural networks to perform both a forward diffusion process (e.g., iteratively apply noise to an input texture) and a reverse diffusion process (e.g., denoising a noised texture). The reverse diffusion process can include parameters (e.g., cross attention parameters) that can be modified by the conditioning parameters 310. The input textures to the diffusion model may be textures generated by a texture encoder 304 from input images (e.g., input image 306). Texture encoder may be a neural network configured to encode image information into an encoded representation referred to herein as a "texture." The texture may be a tensor of the encoded attribute information about the appearance of the image. When the input image 306 is a person, the texture encoder 304 can encode attribute information about the appearance of the avatar with respect to the shape of the person in the image. The neural network of the texture encoder 304 may be trained with N-shot training, resulting in an N-shot texture encoder. One skilled in the art would understand many suitable variations of the machine learning models suitable to encode texture information from an image.

As discussed briefly above, the conditioning parameters 310 may be determined from the text prompt 312. In some examples, keywords from the text prompt 312 relating to the appearance of the desired avatar can be identified in the text prompt 312 and used as conditioning parameters 310. In some examples, semantic information can be extracted (e.g., by the computer system) from the text prompt 312 for use as conditioning parameters 310.

The reverse diffusion process of the diffusion model 302 can be implemented with a U-net neural network. Cross-attention and other parameters of the U-net can be adjusted via the conditioning parameters 310. The parameters of the U-net can also be determined during training. Additional detail about training the diffusion model 302 is provided below with respect to FIGS. 4 and 5.

The output of the diffusion model 302 using conditioning parameters 310 can be neural texture 308. From neural texture 308, texture information can be sampled using two-dimensional information from avatar shape model rasters 318. A texture sampling algorithm 320 can be configured to sample from the neural texture 308 according to each avatar shape model raster 318. The resulting sampled neural texture 322 can be a texture corresponding to an image of the avatar for the avatar shape as modeled by the avatar shape model 314.

The trained avatar model 300 can also include an avatar shape model 314. The avatar shape model 314 can include a FLAME model that can take input avatar shape parameters 316 and generate a three-dimensional model of an avatar. The avatar shape model 314 can also be configured to generate two-dimensional avatar shape model rasters from the three-dimensional model of the avatar. The avatar shape parameters 316 can include pose and expression parameters that define the shape of the three-dimensional avatar shape model. For example, the pose and expression parameters can characterize an avatar with a wide open mouth to represent an avatar producing a particular phonetic sound. The avatar shape parameters 316 can be determined from audio (e.g., audio 208 of FIG. 2) generated from a script (e.g., script 204 of FIG. 2). The avatar shape parameters 316 can also include additional user input to modify the shape of the desired avatar.

The trained avatar model 300 can also include neural renderer 324. The neural renderer 324 can also be a neural network configured to take a texture as input and produce an image as output. For example, the neural renderer 324 can take the sampled neural texture 322 and generate an image frame 326 that depicts the desired avatar shape (in two dimensions) displaying the shape determined for that frame according to the avatar shape parameters 316. Because each image frame 326 can correspond to an image of the avatar as seen while speaking the audio used to generate the avatar shape parameters 316, the sequence of image frames generated by the neural renderer 324 can form a talking avatar video once synchronized with the audio. The neural renderer 324 can include a neural network, including a U-net, to generate the image frame 326 from the sampled neural texture 322 (similar to the reverse process of the texture encoder 304).

Figure 4:
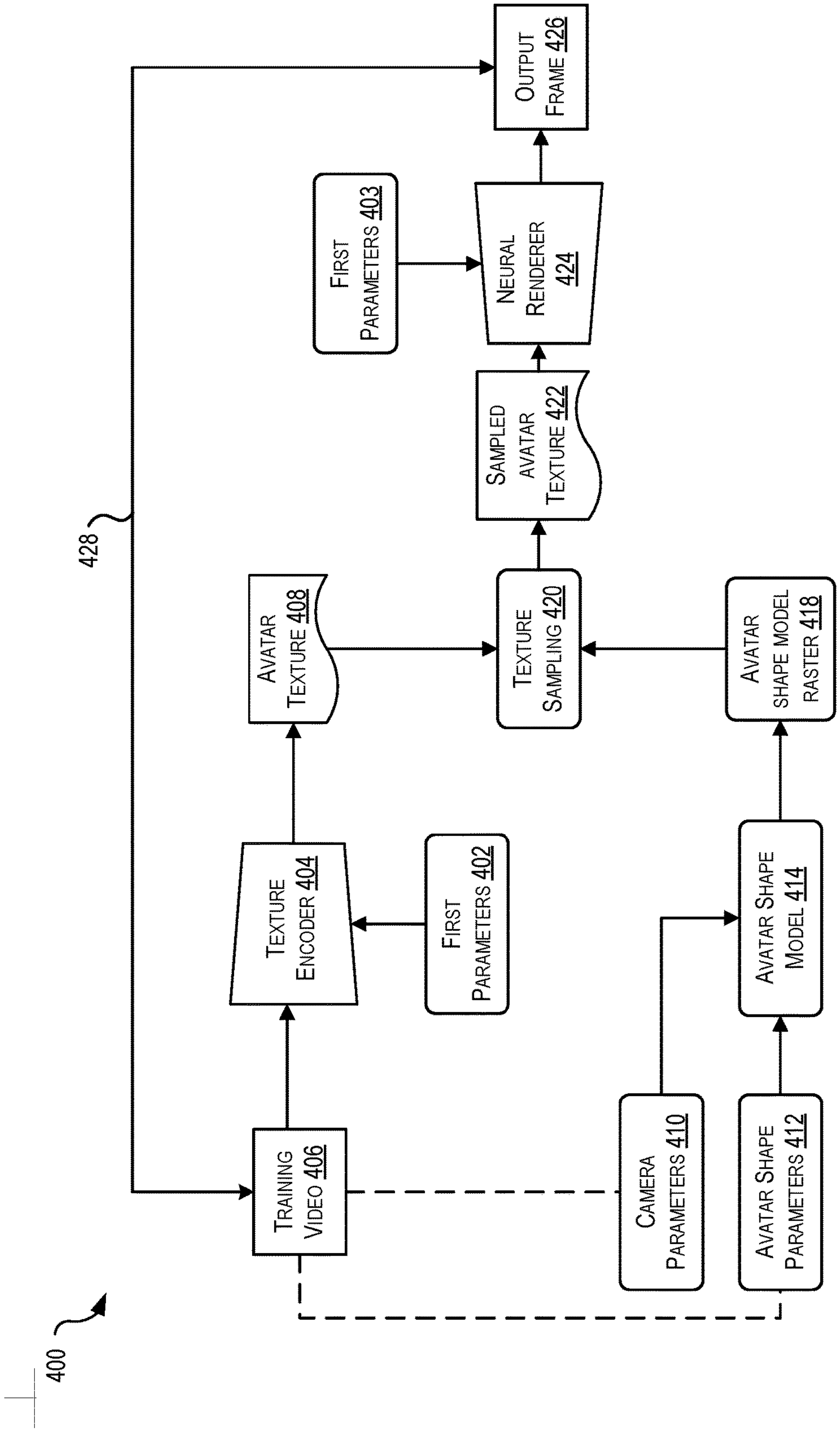
FIG. 4 is a block diagram illustrating a first stage of a two stage training of a trained avatar model, according to some embodiments.

FIG. 4 is a block diagram illustrating a first stage of a two stage training of a portion of a trained avatar model 400, according to some embodiments. The portion of the trained avatar model 400 can include a texture encoder 404 and neural renderer 424, as well as an avatar shape model 414. The texture encoder 404, neural renderer 424, and avatar shape model 414 may be examples of texture encoder 304, neural renderer 324, and avatar shape model 314 of FIG. 3, respectively. The first stage of training the portion of the trained avatar model 400 can determine first parameters 402, 403 for the texture encoder 404 and neural renderer 424 based on the texture encoder 404 generating suitable avatar textures from an input image frame from a training video and the neural renderer 424 subsequently recreating a corresponding output frame from a sampled avatar texture such that the output frame most closely matches the input frame.

Training data for the first stage of training the portion of the trained avatar model 400 can include training video 406.

The training video 406 can be a video depicting a person speaking. The training video 406 may show the person above the shoulders, or may be a full-body or upper-body shot of the person. To fully train the portion of the trained avatar model 400, multiple training videos may be used depicting a wide variety of people speaking a wide variety of words and phrases in a wide variety of languages. Because the training the data uses video of a large variety of people speaking, the trained avatar model is able to generate avatars of any customizable appearance quickly without being limited to generating only a digital twin or other predetermined appearance. Training data including training video 406 depicting an actual person may be used with appropriate authorization with respect to the person depicted.

The training data can also include camera parameters 410 and avatar shape parameters 412. The camera parameters 410 and avatar shape parameters 412 can correspond to each frame of the training video 406. For example, a first frame of the training video 406 may depict the person as they are speaking the first syllable of the word "apple" while looking directly into the camera, so that the mouth of the person is partly open forming the first phonetic component of the word and the person's eyes are open and positioned above center in the camera frame. The corresponding camera parameters 410 can include the pose of the camera (e.g., spatial position and orientation with respect to a coordinate system) as the camera views the person in the frame. The corresponding avatar shape parameters 412 can specify the shape of the person's mouth as they speak the word "apple" in the frame as well as how wide open the eyes are and other parameters that define the shape of the face.

For each from of the training video 406, the texture encoder 404 can generate an avatar texture 408 while the avatar shape model 414 can use the corresponding camera parameters 410 and avatar shape parameters 412 to generate an avatar shape model raster 418. The avatar shape model raster 418 can be a two-dimensional representation of the representation depicted in the input frame of the training video 406 as determined by the avatar shape model 414. The avatar texture 408 can be sampled by the texture sampler 420 using the avatar shape model raster 418 to produce a sampled avatar texture 422. The neural renderer 424 can then generate an output frame 426 from the sampled avatar texture. A comparison 428 of the output frame 426 and the input frame of the training video 406 can be made. Based on the comparison 428, the first parameters 402 of the texture encoder 404 and the first parameters 403 of the neural renderer 424 may be updated. The training may be self-supervised. The first parameters 402 and the first parameters 403 may be collectively referred to as "first parameters" of the trained avatar model.

Figure 5:
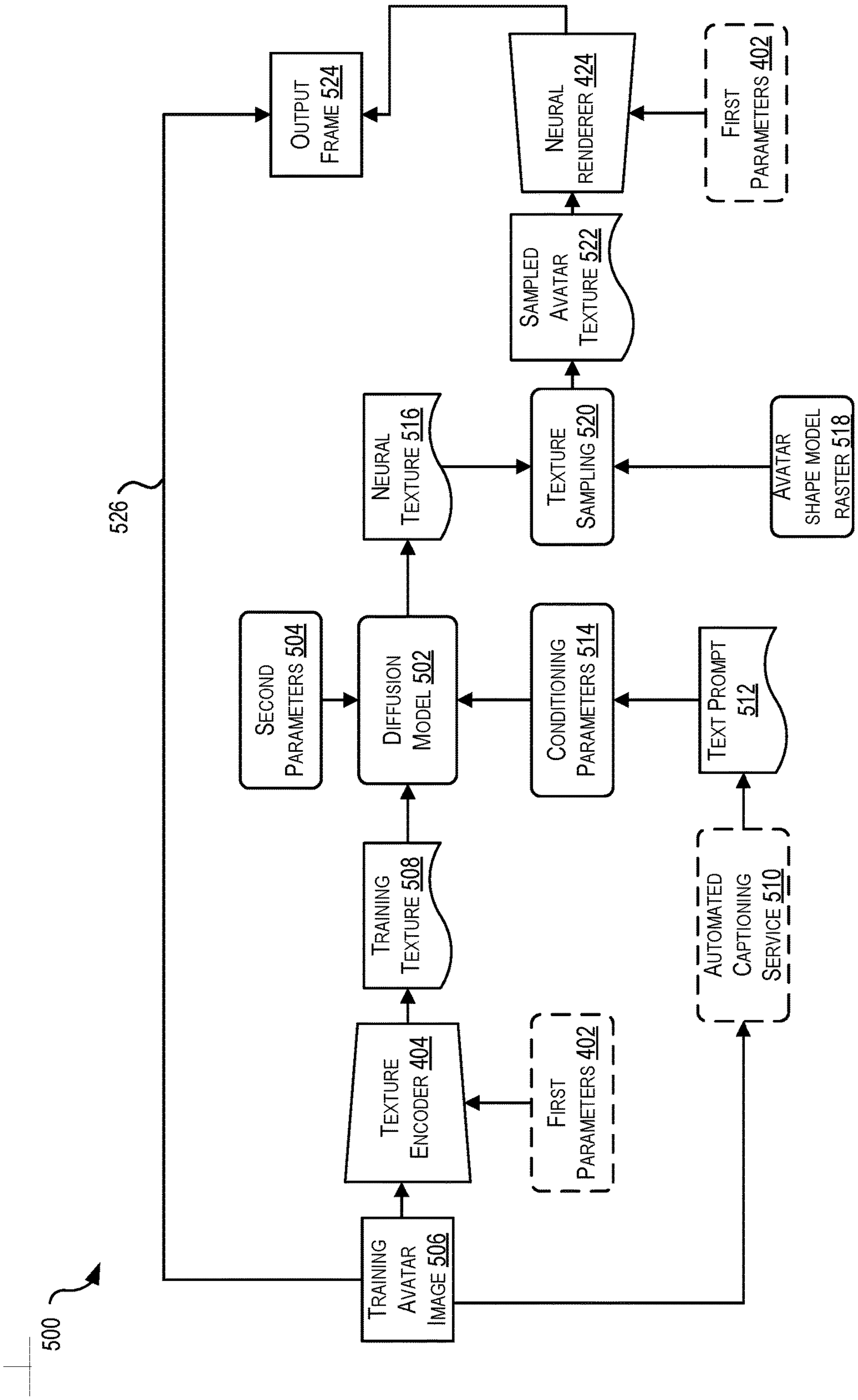
FIG. 5 is a block diagram illustrating a second stage of a two stage training of the trained avatar model, according to some embodiments.

FIG. 5 is a block diagram illustrating a second stage of a two stage training of the trained avatar model 500, according to some embodiments. The trained avatar model 500 can include a diffusion model 502, which may be an example of the diffusion model 302 discussed above with respect to FIG. 3. The second stage of training the trained avatar model 500 can also include the texture encoder 404 and neural renderer 424 that were trained as part of the first stage of the training described above with respect to FIG. 4. The trained texture encoder 404 and neural renderer 424 can therefore have corresponding first parameters 402, 403 characterizing their behavior within the trained avatar model 500.

The training data for the second stage of training the trained avatar model 500 can include training avatar images (e.g., training avatar image 506) and corresponding text prompts for each image. The training avatar image 506 can be used by the trained texture encoder 404 to produce training texture 508. The diffusion model 502 can then generate an output neural texture 516 from the training texture 508. Conditioning parameters 514 for the diffusion model 502 can be determined from the corresponding text prompt 512 and used by the diffusion model 502 when inferring the neural texture 516. A texture sampler 520 can sample the neural texture 516 using an avatar shape model raster determined for the training avatar image 506 to produce the sampled avatar texture 522. The trained neural renderer 424 can then generate an output frame 524. A comparison 526 between the output frame 524 and the input training avatar image 506 can then be used to update second parameters 504 of the diffusion model 502. For example, the second parameters 504 may be noise parameters of the diffusion forward process that iteratively add noise to the training texture 508, from which the diffusion reverse process can subsequently infer the neural texture 516. One skilled in the art would recognize many variations for training a latent diffusion network according to the techniques described herein.

As part of the second stage of training the trained avatar model 500, each training avatar image 506 and the resulting training texture 508 has a corresponding text prompt 512. The text prompt 512 can be generated by hand or as part of the training data set by an automated captioning service 510. The automated captioning service 510 can be configured to produce a text description of the person or avatar depicted in the training avatar image 506. For example, if the training avatar image 506 shows a woman wearing casual, dark-colored business attire, a corresponding text prompt 512 generated by the automated captioning service 510 may be "upper body shot of a woman dressed in black business casual." The automated captioning service 510 can allow the computer system to generate substantial training data very quickly with less input from personnel to manually generate or adapt text prompts to the corresponding images.

Figure 6:
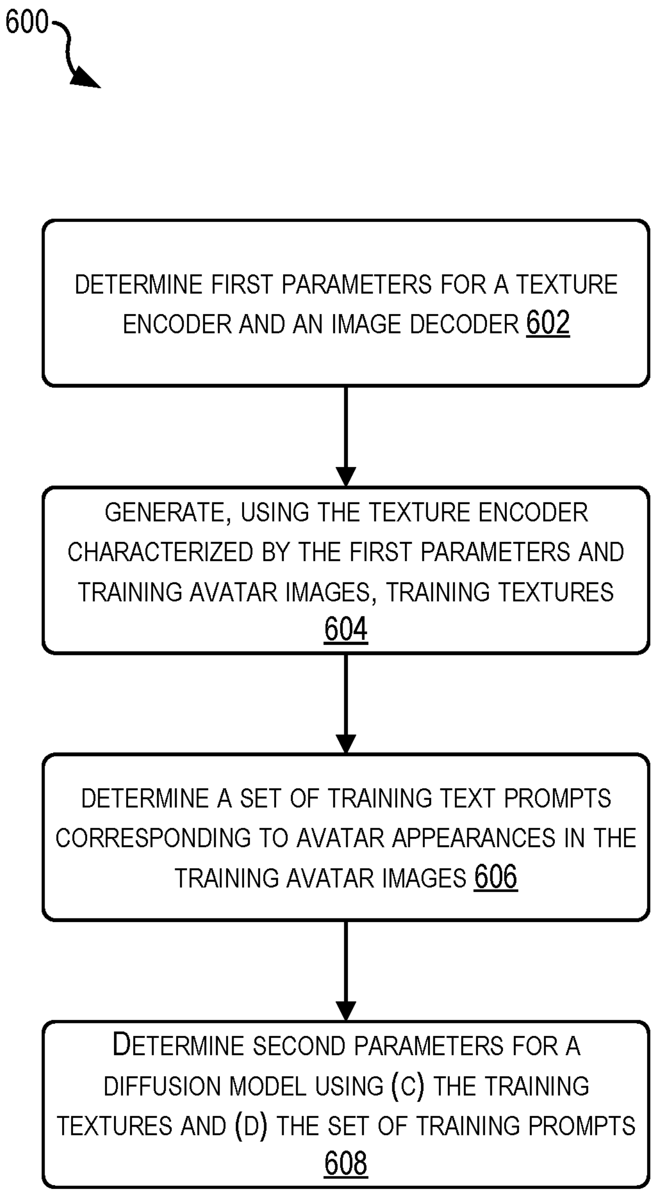
FIG. 6 is a flow diagram of an example process for training a trained avatar model, according to some embodiments.

FIG. 6 is a flow diagram of an example process 600 for training a trained avatar model, according to some embodiments. The process 600 may be performed by one or more components of a computer system (e.g., computer system 200 of FIG. 2). The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 600 (or any other processes described herein, for example process 700 described below with respect to FIG. 7, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 600 can begin at block 602, with the computer system determining first parameters for a texture encoder (e.g., texture encoder 404 of FIG. 4) and a neural renderer (e.g., neural renderer 424 of FIG. 4) using training data. The training data can include a training video depicting a speech performance and camera pose and shape parameters for each frame of the training video. For example, each frame of the training video can show the person at a particular moment of saying a word, such that the face's shape (e.g., position of lips, how open or closed the eyes are, a position of the lower jaw) can be characterized by the shape parameters and the position and orientation of the camera viewing the person can be characterized by the camera pose. In some embodiments, the neural renderer can include a U-net convolutional neural network.

In some embodiments, determining the first parameters can include the computer system using the texture encoder to generate an avatar texture for each frame of the training video. The computer system can then execute an avatar shape model (e.g., avatar shape model 414 of FIG. 4) to generate avatar shape model rasters for each frame of the training video. The avatar shape model can take the camera pose and shape parameters as inputs. The computer system can then sample the avatar texture using the avatar shape model rasters to produce a sampled avatar texture for each frame of the training video and then generate an output frame corresponding to each frame of the training video using the image encoder. The computer system can then compare each output frame to the corresponding frame of the training video to determine how the first parameters should be adjusted.

At block 604, the computer system can generate training textures from the training videos. For example, for each frame of the training video, the texture encoder can generate a corresponding training texture. The texture encoder can be characterized by the first parameters, which can be determined during a first stage of the training of the trained avatar model. In some embodiments, the texture encoder is N-shot RGB to texture encoder.

At block 606, the computer system can determine a set of training text prompts corresponding to avatar appearances in the training avatar images. The training text prompts may be premade for various avatar appearances and tagged to a corresponding training avatar image. In some embodiments, an automated captioning service (e.g., automated captioning service 510 of FIG. 5) can generate a text prompt describing the appearance of the avatar in the training avatar images. The text prompts can be similar to text prompts that will be produced by a user of the trained avatar model.

At block 608, the computer system can determine second parameters for a diffusion model of the trained avatar model. The computer system can input the training textures and the set of training prompts into the diffusion model to generate neural textures. The neural textures can then be sampled based on an avatar shape model raster to create sampled neural textures. The sampled neural textures can be input into the trained neural renderer characterized by the first parameters to produce output images from each training texture and training prompt. The computer system can then compare the output images to the corresponding training avatar images. The second parameters may be noise parameters for a forward diffusion process in the diffusion model of the trained avatar model.

Figure 7:
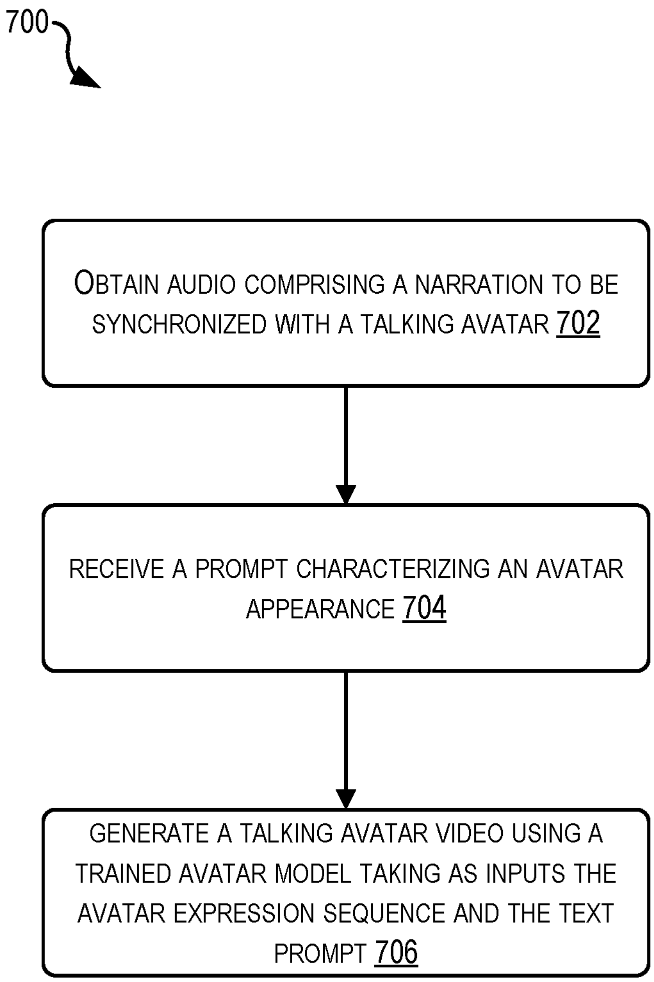
FIG. 7 is another flow diagram of an example process for generating a talking avatar video using a trained avatar model, according to some embodiments.

FIG. 7 is another flow diagram of an example process 700 for generating a talking avatar video (e.g., talking avatar video 218 of FIG. 2) using a trained avatar model (e.g., trained avatar model 202 of FIG. 2), according to some embodiments. As with process 600 of FIG. 6, the process 700 may be performed by one or more components of a computer system (e.g., computer system 200 of FIG. 2).

The process 700 can begin at block 702, where the computer system can generate audio from a script. The script can include text of a narration to by synchronized with a talking avatar. The computer system can receive the script from a user device (e.g., user device 104 of FIG. 1). For example, a user can write a script to be spoken by an avatar in the trained avatar model. In some embodiments, the script received from the user device can be generated using a speech to text system at the user device. For example, the user can recite the words they wish to be used as the script for the talking avatar video, and the user device can produce the script and send it to the computer system. In some embodiments, the computer system can obtain a prewritten script from storage. The computer system can generate the audio using a text to speech system. The audio can include speech in one or more languages and various accents for those languages. For example, the script may have a first section written in English and a second section written in Spanish. The resulting audio can include speech in both English and Spanish for the corresponding sections. The user device can receive a selection of a particular accent to use (e.g., a selection from a user). For example, the user can specify that they want the resulting avatar to speak in a Southern American accent. In some instances, the computer system may infer a particular accent to use when generating the audio based on the text in the script.

In some embodiments, the computer system can use the audio to generate an avatar expression sequence using the audio. The avatar expression sequence can be generated by an avatar shape forming model configured to determine parameters of the shape of an avatar and the position of lips, mouth, jaw, and other features as the avatar speaks the corresponding words in the audio. The avatar expression sequence can include, for example, viseme vectors that associate the shape and orientation of the lips, mouth, tongue, and jaw of the avatar with various phonemes present in the audio. For example, the avatar expression sequence for an avatar saying the word "apple" can specify the parameters for the mouth first opening with the lower jaw dropping, then closing, then opening again. The parameters can describe the shape of the avatar for each frame of the video that depicts the avatar speaking the corresponding audio. In some embodiments, the avatar expression sequence may be predetermined and not generated from particular audio. For example, a previously generated avatar expression sequence may be reused to generate a new talking avatar speaking the same or similar narration. The computer system implementing the trained avatar model 202 can then obtain the existing avatar expression sequence.

At block 704, the computer system can receive a prompt characterizing an avatar appearance. The prompt may be received from a user device. The prompt can include a text description of the desired avatar. The prompt can include information characterizing an avatar's appearance, hair color, hair style, eye color, clothing style, and/or whether the avatar should be depicted in a full body view, an upper body view, or a head shot view. For example, a prompt may be the text string "an upper body shot of a casually dressed person in their mid-twenties." The prompt can also specify an emotion for the avatar, including "neutral," "excited," "happy," and the like.

At block 706, the computer system can generate a talking avatar video using a trained avatar model (e.g., trained avatar model 300 of FIG. 3). The trained avatar model can take the avatar expression sequence and the text prompt as inputs. The trained avatar model can include a diffusion model configured to use the prompt to generate a neural texture for the talking avatar. The neural texture can be a tensor including information defining the appearance of the desired talking avatar. The neural texture can be sampled to provide a sampled neural texture for each frame of the output video. Advantageously, the diffusion model need only be executed once to generate the neural texture that is usable for the entire talking avatar video, thereby substantially reducing the computational expense of the disclosed techniques as compared to existing method of using diffusion methods to generate video. The computer system can synchronize the audio with a sequence of image frames generated using the neural texture. The synchronized audio with the sequence of image frames can constitute the talking avatar video.

In some embodiments, the computer system can also generate an avatar shape model raster corresponding to each frame of the talking avatar video. The avatar shape model raster can be produced by an avatar shape model (e.g., FLAME) using the avatar expression sequence as an input. The computer system can then sample the neural texture using the avatar shape model rasters to produce a sampled avatar texture corresponding to each frame of the talking avatar video. The computer system can then generate the sequence of image frames of the talking avatar video by inputting the sampled neural textures to a neural renderer (e.g., neural renderer 324 of FIG. 3).

In some embodiments, a user can make changes or updates to the script after the talking avatar video is generated using the trained avatar model. Because the script is used to change the shape of the avatar, the neural texture generated by the diffusion model of the trained avatar model can be reused to create an updated talking avatar video, avoiding the expense of running the diffusion model a second time. For example, after reviewing the initial talking avatar video, a user may add additional words to the script as well as change the accent for the speech. As another example, the user may change the language of the script from a first language to the second language. The computer system can receive an indication to change script from the first language to the second language and determine an updated determine an updated script in the second language. The computer system can translate the script to the selected second language without the need for the user to recreate the script entirely. The computer system can then generate updated audio and an updated avatar expression sequence by inputting the updated script into a TTS system and the updated audio into the avatar shape forming model. The computer system can generate an updated talking avatar video using the trained avatar model by inputting the updated avatar expression sequence into an avatar shape model to generate updated avatar shape model rasters and using the neural texture previously generated by the diffusion model using the prompt.

Similarly, in some embodiments, a user can modify the avatar shape parameters of the desired avatar in the talking avatar video. For example, after reviewing the avatar in the talking avatar video, the user can make modification to the avatar shape using sliders to adjust the position of the avatar's features, including narrowing or widening the face, adjusting eye position and shape, modifying lip shape, and the like. The user adjustments can be received at a user device. For example, the sliders may be elements of a GUI of the user device allowing fast and easy adjustments of facial features. The computer system can receive the input to modify avatar shape parameters from the user device and generate an updated avatar expression sequence using the avatar shape parameters. The computer system can then generate an updated talking avatar video using the trained avatar model taking the updated avatar expression sequence as input. The computer system can use the neural texture previously generated by the diffusion model using the prompt.

In some embodiments, the computer system can receive an updated text prompt characterizing an updated avatar appearance. The computer system can then generate an updated talking avatar video using the trained avatar model including the diffusion model. The diffusion model can be configured to use the updated text prompt to generate an updated neural texture for the talking avatar. The updated talking avatar video can include the audio synchronized with an updated sequence of image frames generated using the updated neural texture.

Figure 8:
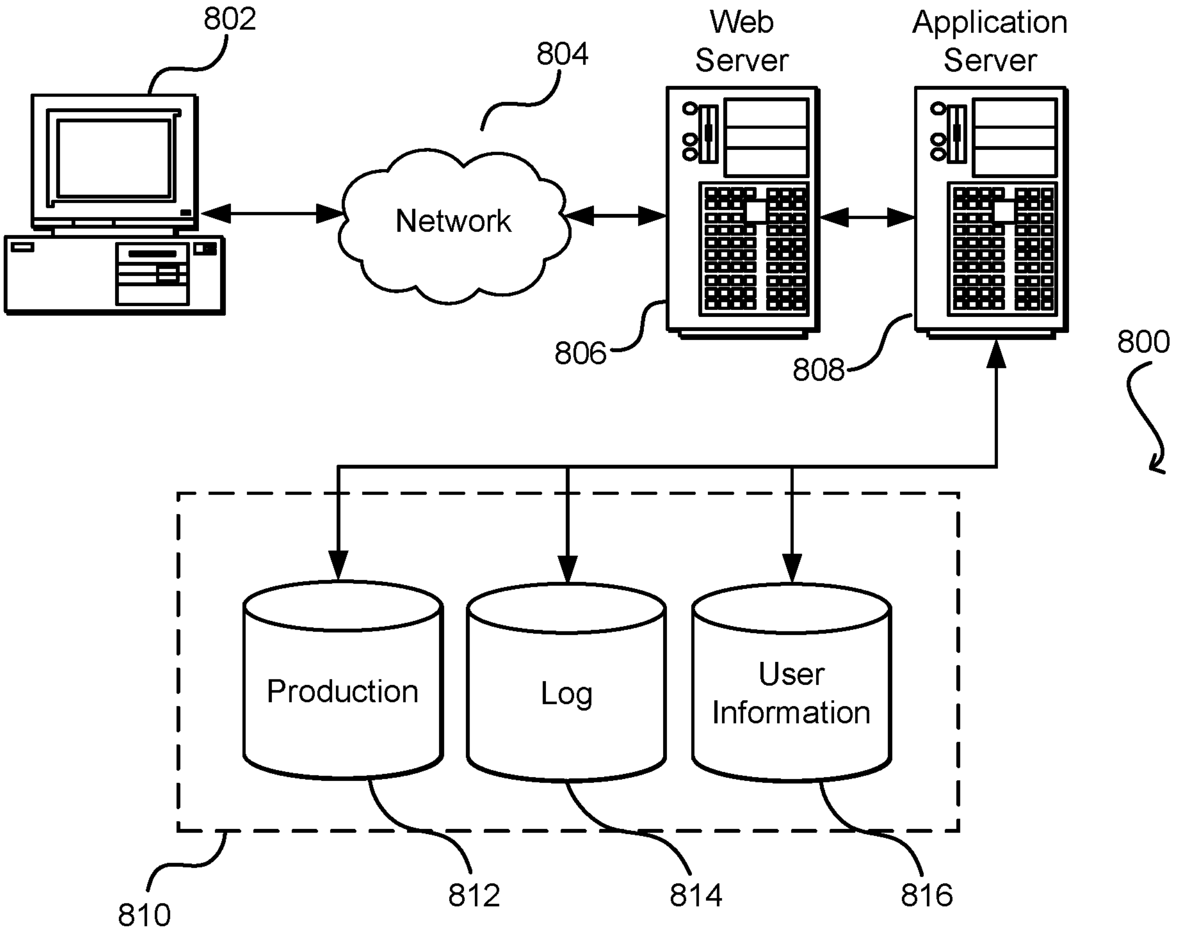
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, by a computing device, a script comprising text of a narration to be synchronized with a talking avatar;

generating, by the computing device using a text to speech model, audio from the script;

generating, by the computing device, an avatar expression sequence from the audio;

receiving a text prompt characterizing an avatar; and generating a talking avatar video using a trained avatar model by at least:

generating, using a trained diffusion model of the trained avatar model, a neural texture, the trained diffusion model configured to take the text prompt as input, and the neural texture generated once by the trained diffusion model based on the text prompt using a single reverse diffusion process when generating the talking avatar video;

determining, using the avatar expression sequence, an avatar shape model raster corresponding to each frame of the talking avatar video;

sampling, using the avatar shape model rasters, the neural texture to produce a sampled avatar texture corresponding to each frame of the talking avatar video;

generating, using the sampled avatar textures, a sequence of image frames of the talking avatar video; and synchronizing the audio with the sequence of image frames.

2. The computer-implemented method of claim 1, wherein the trained avatar model further comprises a texture encoder and a neural renderer, and wherein the trained avatar model is trained by at least:

(i) determining first parameters for the texture encoder and the neural renderer using training data comprising (a) a training video depicting a speech performance and (b) camera pose and shape parameters for each frame of the training video; and (ii) determining second parameters for the trained diffusion model using (c) training neural textures generated by the texture encoder using the first parameters and (d) training text prompts characterizing output images from the neural renderer using the first parameters.

3. The computer-implemented method of claim 1, wherein generating the talking avatar video further comprises:

generating, using the avatar expression sequence, an avatar shape model raster corresponding to each frame of the talking avatar video;

sampling, using the avatar shape model rasters, the neural texture to produce a sampled avatar texture corresponding to each frame of the talking avatar video; and generating, using the sampled avatar textures, the sequence of image frames of the talking avatar video.

4. A computing device, comprising:

one or more processors; and one or more memories storing instructions that, when executed by the one or more processors, cause the computing device to:

obtain audio comprising a narration to be synchronized with a talking avatar;

receive, from a user device, a prompt characterizing an avatar appearance; and generate a talking avatar video using a trained avatar model taking as inputs an avatar expression sequence and the prompt, the trained avatar model comprising a trained diffusion model configured to use the prompt to generate a neural texture for the talking avatar, the neural texture generated once by the trained diffusion model based on the prompt using a single reverse diffusion process when generating the talking avatar video, and the talking avatar video comprising the audio synchronized with a sequence of image frames generated using the neural texture.

5. The computing device of claim 4, wherein the one or more processors store additional instructions that, when executed by the one or more processors, cause the computing device to further:

generate the avatar expression sequence using the audio;

generate, using the avatar expression sequence, an avatar shape model raster corresponding to each frame of the talking avatar video;

sample, using the avatar shape model rasters, the neural texture to produce a sampled avatar texture corresponding to each frame of the talking avatar video; and generate, using the sampled avatar textures, the sequence of image frames of the talking avatar video.

6. The computing device of claim 4, wherein the neural texture comprises a tensor representation of the appearance of the talking avatar.

7. The computing device of claim 4, wherein the avatar expression sequence comprises a plurality of viseme vectors.

8. The computing device of claim 7, wherein the prompt is a text prompt input at the user device.

9. The computing device of claim 4, wherein the one or more processors store additional instructions that, when executed by the one or more processors, cause the computing device to further receive, from the user device, a script corresponding to the audio.

10. The computing device of claim 4, wherein the narration is in a first language, and wherein the one or more processors store additional instructions that, when executed by the one or more processors, cause the computing device to further:

receive, from the user device, an indication to change the narration from the first language to a second language;

determine an updated script in the second language;

generate, using the updated script, updated audio;

generate an updated avatar expression sequence using the updated audio; and generate an updated talking avatar video using the trained avatar model taking the updated avatar expression sequence and using the neural texture previously generated by the trained diffusion model using the prompt.

11. The computing device of claim 4, wherein the one or more processors store additional instructions that, when executed by the one or more processors, cause the computing device to further:

receive, at a user device, input to modify avatar shape parameters associated with the avatar expression sequence;

generate an updated avatar expression sequence using the avatar shape parameters; and generate an updated talking avatar video using the trained avatar model taking the updated avatar expression sequence as input and using the neural texture previously generated by the trained diffusion model using the prompt.

12. The computing device of claim 11, wherein the input to modify the avatar shape parameters is received at graphical user interface of the user device, the graphical user interface including one or more sliders to adjust the avatar shape parameters.

13. The computing device of claim 4, wherein the one or more processors store additional instructions that, when executed by the one or more processors, cause the computing device to further:

receive an updated text prompt characterizing an updated avatar appearance;

generate an updated talking avatar video using the trained avatar model, the trained diffusion model configured to use the updated text prompt to generate an updated neural texture for the talking avatar, and the updated talking avatar video comprising the audio synchronized with an updated sequence of image frames generated using the updated neural texture.

14. The computing device of claim 4, wherein the trained diffusion model omits optimization of the neural texture based on the prompt.

15. A method for training an avatar model, the method comprising:

determining first parameters for a texture encoder and a neural renderer using training data comprising (a) a training video depicting a speech performance and (b) camera pose and shape parameters for each frame of the training video;

generating, using the texture encoder characterized by the first parameters and training avatar images, training textures;

determining a set of training text prompts corresponding to avatar appearances in the training avatar images, each training text prompt of the set of training text prompts having a corresponding training avatar image and a corresponding training texture; and determining second parameters for a diffusion model using (c) the training textures and (d) the set of training text prompts by at least comparing output images from the neural renderer characterized by the first parameters to the training avatar images, wherein the diffusion model takes as input a training texture and the corresponding training text prompt to produce a corresponding neural texture, and wherein each output image of the output images is generated by the neural renderer characterized by the first parameters based on the corresponding neural texture.

16. The method of claim 15, wherein determining the first parameters comprises:

generating, using the texture encoder and the training video, an avatar texture for each frame of the training video;

generating, using the camera pose and shape parameters, avatar shape model rasters for each frame of the training video;

sampling, using the avatar shape model rasters, the avatar texture to produce a sampled avatar texture for each frame of the training video;

generating, using the neural renderer and the sampled avatar textures, an output frame corresponding to each frame of the training video; and comparing each output frame to the corresponding frame of the training video.

17. The method of claim 15, wherein the second parameters characterize added noise in a forward process of the diffusion model.

18. The method of claim 15, wherein the texture encoder comprises an n-shot RGB to texture encoder.

19. The method of claim 15, wherein the neural renderer comprises a U-net convolutional neural network.

20. The method of claim 15, wherein determining the set of training prompts comprises determining the set of training prompts using an automated descriptive captioning service.

* * * * *